(12) United States Patent
Yen et al.

(10) Patent No.: US 11,491,847 B2
(45) Date of Patent: Nov. 8, 2022

(54) POSITIVE TEMPERATURE COEFFICIENT HEATERS AND RADIANT APPLICATIONS THEREOF

(71) Applicant: GM GLOBAL TECHNOLOGY OPERATIONS LLC, Detroit, MI (US)

(72) Inventors: Chih-hung Yen, Bloomfield Hills, MI (US); Taeyoung Han, Bloomfield Hills, MI (US); Bahram Khalighi, Birmingham, MI (US); Kuo-huey Chen, Troy, MI (US); Shailendra Kaushik, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 663 days.

(21) Appl. No.: 16/286,881

(22) Filed: Feb. 27, 2019

(65) Prior Publication Data

US 2020/0269655 A1 Aug. 27, 2020

(51) Int. Cl.
*B60H 1/22* (2006.01)
*H05B 3/34* (2006.01)
*H05B 1/02* (2006.01)

(52) U.S. Cl.
CPC ......... *B60H 1/2218* (2013.01); *B60H 1/2225* (2013.01); *H05B 1/0238* (2013.01); *H05B 3/34* (2013.01); *B60H 2001/2293* (2013.01); *H05B 2203/02* (2013.01)

(58) Field of Classification Search
CPC .. B60H 1/2218; B60H 1/2225; B60H 1/2227; B60H 2001/2293; H05B 1/0238; H05B 1/0236; H05B 3/34; H05B 3/50; H05B 3/06; H05B 3/0042; H05B 2203/02; H05B 2203/029; H05B 2203/023; H05B 2203/035

See application file for complete search history.

(56) References Cited

U.S. PATENT DOCUMENTS

| 2008/0223841 | A1* | 9/2008 | Lofy | H05B 3/20 219/202 |
| 2014/0339211 | A1* | 11/2014 | Barfuss | B60N 2/5678 219/202 |
| 2015/0108112 | A1 | 4/2015 | Gries | |
| 2015/0292232 | A1* | 10/2015 | Ogilvie | B60J 1/2011 160/48 |

FOREIGN PATENT DOCUMENTS

| CN | 102416892 A | 4/2012 |
| CN | 102419220 A | 4/2012 |
| CN | 102529641 A | 7/2012 |
| CN | 102668691 A | 9/2012 |
| CN | 203327269 U | 12/2013 |
| CN | 203626565 U | 6/2014 |

(Continued)

*Primary Examiner* — Shawntina T Fuqua
(74) *Attorney, Agent, or Firm* — Quinn IP Law

(57) ABSTRACT

A heating apparatus is provided. The heating apparatus includes a positive temperature coefficient (PTC) heating element and a power controller configured to generate and apply a pulse width modified signal to the PTC heating element. The power controller is configured to vary a current of the pulse width modified signal linearly with respect to a temperature of a space being heated by the PTC heating element.

16 Claims, 8 Drawing Sheets

(56) References Cited

FOREIGN PATENT DOCUMENTS

| CN | 203739580 U | 7/2014 | | |
|---|---|---|---|---|
| CN | 203980421 U | 12/2014 | | |
| CN | 104354620 A | 2/2015 | | |
| CN | 204153852 U | 2/2015 | | |
| CN | 104691271 A | 6/2015 | | |
| CN | 105766057 A | 7/2016 | | |
| CN | 106347067 A | 1/2017 | | |
| CN | 106949526 A | 7/2017 | | |
| CN | 206336105 U | 7/2017 | | |
| CN | 107031346 A | 8/2017 | | |
| CN | 107949501 A | 4/2018 | | |
| CN | 107487164 B | * 3/2022 | ............ | B60J 1/2041 |
| JP | 2007283790 A | 11/2007 | | |
| KR | 20120028708 A | 3/2012 | | |
| TW | 201309499 A | 3/2013 | | |

\* cited by examiner

Fig-5A
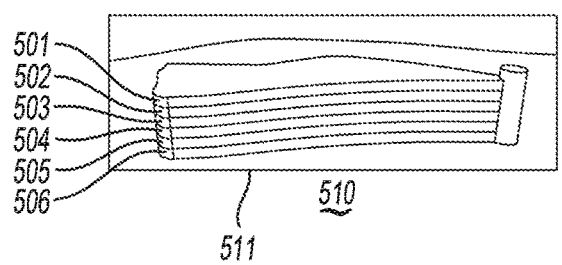
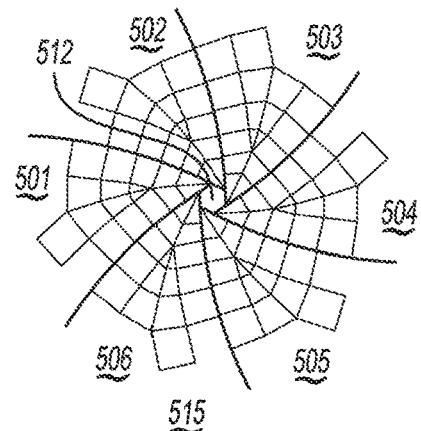
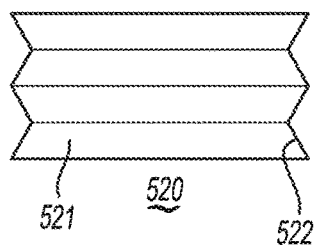
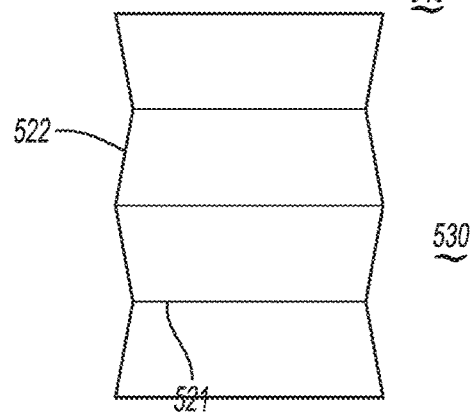
Fig-5B
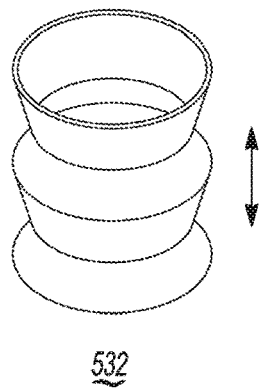
Fig-5C
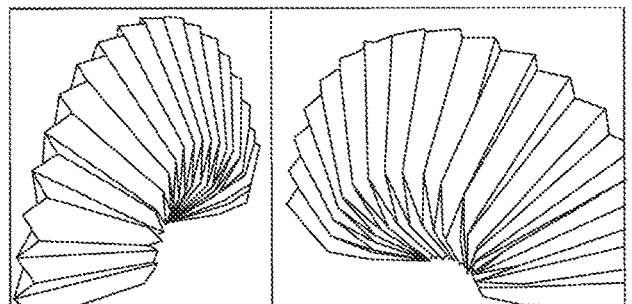
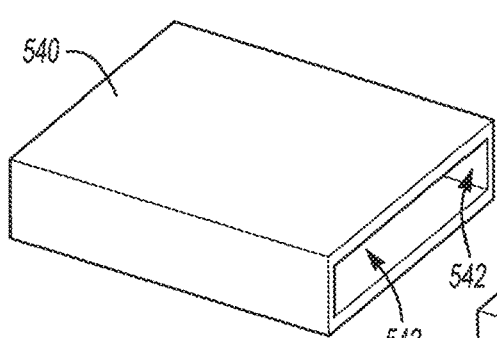
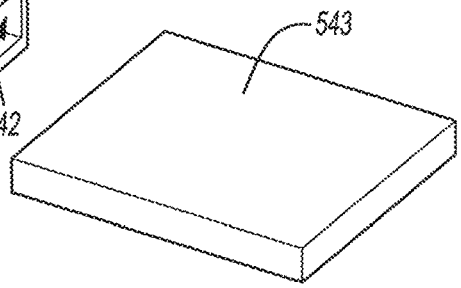
Fig-5D

POSITIVE TEMPERATURE COEFFICIENT HEATERS AND RADIANT APPLICATIONS THEREOF

CROSS REFERENCE TO RELATED APPLICATIONS

The present application is related to U.S. application Ser. No. 16/287,062 entitled Positive Temperature Coefficient Heaters and Contact Applications Thereof filed on Feb. 27, 2019, the disclosure of which is hereby incorporated herein in its entirety.

INTRODUCTION

Apparatuses and methods consistent with exemplary embodiments relate to configurations of radiant heating devices. More particularly, apparatuses and methods consistent with exemplary embodiments relate to the integration of radiant heaters in vehicles.

SUMMARY

One or more exemplary embodiments provide a positive temperature coefficient heater integrated into vehicle or component. More particularly, one or more exemplary embodiments provide a positive temperature coefficient apparatus, and deployment and integration methods thereof.

According to an aspect of an exemplary embodiment, a heating apparatus is provided. The apparatus includes a positive temperature coefficient (PTC) heating element; and a power controller configured to generate and apply a pulse width modified signal to the PTC heating element. The power controller is configured to vary a current of the pulse width modified signal linearly with respect to a temperature of a space being heated by the PTC heating element.

The positive temperature coefficient (PTC) heating element may be integrated into one or more from among a backside of a headrest, an upper backside of a seat, a lower backside of a seat, an area under a dashboard, a roof, a visor, and a door.

The PTC heating element may be a single fold PTC heating element and the apparatus may further include a rotating member arranged on one side of the single fold PTC heating element perpendicular to a fold line of the single fold PTC heating element. The rotating member may rotate around an axis of the single fold so as to deploy the PTC heating element to an open state and close the PTC heating element to a folded state.

The PTC heating element may be a bifold PTC heating element and the apparatus may further include a sliding member arranged at an edge of the bifold PTC heating element perpendicular to a fold line of the bifold PTC heating element. The sliding member may slide along a guide so as to deploy the PTC heating element to an expanded state and retract the bifold PTC heating element to a folded state.

The PTC heating element may include a plurality of folds and the apparatus may further include two double jointed arms arranged at opposite edges of the PTC heating element perpendicular to fold lines of the PTC heating element.

The first arm of the double-jointed arms may be disposed at one end parallel to the plurality of folds. The first arm may include a first joint at a first end of the first arm and a second joint disposed between the first joint and a second end of the first arm. The first joint is configured to rotate in a counter-clockwise direction and the second joint is configured to rotate in a clockwise direction to expand the PTC heating element to a deployed state and the first joint is configured to rotate in a clockwise direction and the second joint is configured to rotate in a counter-clockwise direction to retract the PTC heating element to a folded state.

The second arm of the double-jointed arms is disposed at the one end parallel to the plurality of folds on a side opposite to the first arm, the second arm comprising a third joint at a first end of the second arm and a fourth joint disposed between the third joint and a second end of the second arm. The third joint is configured to rotate in a clockwise direction and the fourth joint is configured to rotate in a counter-clockwise direction to expand the PTC heating element to the deployed state and the third joint is configured to rotate in a counter-clockwise direction and the fourth joint is configured to rotate in a clockwise direction to retract the PTC heating element to the folded state.

The positive temperature coefficient (PTC) heating element comprises a cylindrical structure comprising a plurality of fold lines running around a circumferential axis such that the cylindrical structure expands and retracts along a longitudinal axis of the cylindrical structure.

The PTC heating element may include a plurality of sections, and the plurality of sections may be stacked on top of each other in a retracted state, configured to rotate around an axis to so as to move from stacked positions in the retracted state to adjacent positions in the deployed state.

The apparatus may also include a sliding shade comprising busbars and an insulation layer interposed between an interior facing part of the sliding shade and the PTC heating element. The PTC heating element may be disposed on the insulation layer.

The sliding shade may be a sunroof shade integrated in a vehicle roof.

The apparatus may also include a sliding shade a plurality of the PTC heating element, an insulation layer interposed between an interior facing part of the sliding shade and the plurality of the PTC heating element. The plurality of the PTC heating element are disposed on the insulation layer and a first PTC heating element of the plurality of the PTC heating element may be disposed on a section of the shade above a front left seat and a second PTC heating element of the plurality of the PTC heating element may be disposed on a section of the shade above a front right seat.

A third PTC heating element of the plurality of the PTC heating element may be disposed on a section of the shade above a rear left seat and a fourth PTC heating element of the plurality of the PTC heating element may be disposed on a section of the shade above a rear right seat.

The apparatus may include a rolling shade comprising busbars and an insulation layer interposed between an interior facing part of the rolling shade and the PTC heating element. The PTC heating element may be disposed in between the busbars and on the insulation layer. The rolling shade may be a sunroof shade integrated in a vehicle roof and the busbars may be arranged parallel to a rod of the rolling shade.

The power controller may be configured to set the current of the pulse width modified signal to 100% if the temperature of the space being heated is less than a first predetermined value and set the current of the pulse width modified signal to 0% if the temperature of the space being heated is greater than a second predetermined value, the second predetermined value being greater than the first predetermined value.

The power controller may be configured to vary the current of the pulse width modified signal linearly if the temperature of a space being heated is between the first determined value and second predetermined value.

The PTC heating element may comprise a flexible printed circuit. In addition, the PTC heating element may comprise one or more from among ceramic, silicon rubber, and carbon.

The space being heated by the PTC heating element may be a vehicle interior and the temperature may be the temperature of the vehicle interior.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein:

FIGS. 5A-5D show additional illustrations of deployable positive temperature coefficient heating elements according to several exemplary embodiments.

DETAILED DESCRIPTION

Figure 1:
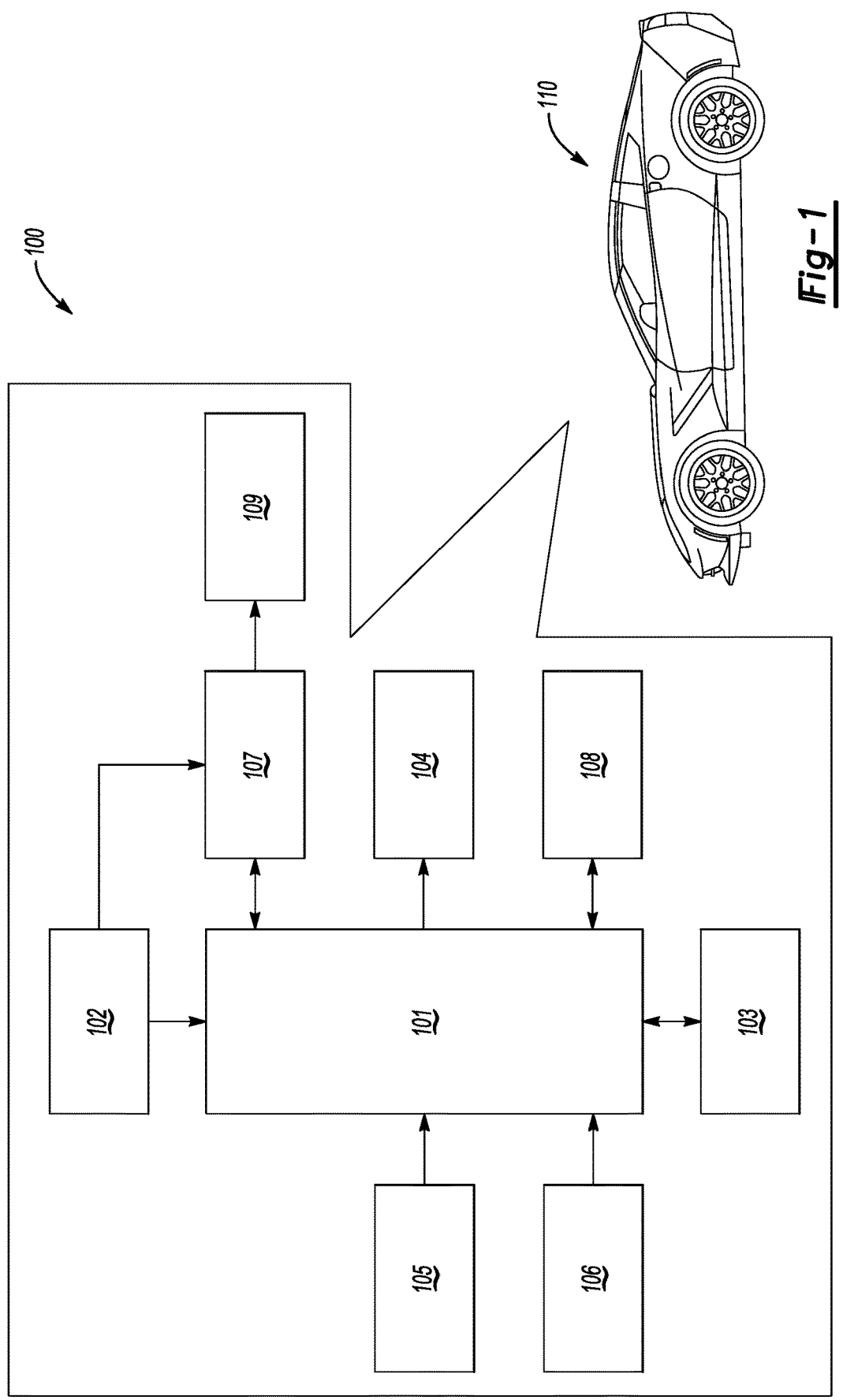
FIG. 1 shows a block diagram of a heating apparatus according to an exemplary embodiment.

A heating apparatus will now be described in detail with reference to FIGS. 1-6C of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Most vehicles are equipped with a heater core and blower that forces air through the heater core to transfer heat from the coolant in the heater core to the cabin air system. The heater core and blower heater system requires vents and fans which take up space in the vehicle. Moreover, with the development of electric vehicles, engines and engine coolant will no longer be required in vehicles. Thus, an alternative apparatus for heating a vehicle space or cabin will be required.

Radiant heaters provide one alternative to heater cores in vehicle space or cabin heating applications. One type of radiant heater is a positive temperature coefficient (PTC) heating element. A PTC heating element turns electrical energy into heat and may be flexible allowing for several types of integrations. However, the PTC heating element must be integrated in a manner that effectively heats a vehicle while maintaining the aesthetic appeal of the interior of the vehicle. In addition, the effective heating of an interior space may require a PTC heating element with a greater surface area than is available. Thus, the apparatus may also expand and contract, or deploy and retract PTC heating elements as necessary.

FIG. 1 shows a block diagram of a heating apparatus according to an exemplary embodiment. As shown in FIG. 1, the heating apparatus 100, according to an exemplary embodiment, includes a controller 101, a power supply 102, a storage 103, an output 104, a sensor 105, a user input 106, a power controller 107, a communication device 108 and a PTC heating element 109. However, the heating apparatus 100 is not limited to the aforementioned configuration and may be configured to include additional elements and/or omit one or more of the aforementioned elements. The heating apparatus 100 may be implemented as part of a vehicle, as a standalone component, or as a hybrid between an on vehicle and off vehicle device.

The controller 101 controls the overall operation and function of the heating apparatus 100. The controller 101 may directly or indirectly control one or more of a power supply 102, a storage 103, an output 104, a sensor 105, a user input 106, a power controller 107, a communication device 108 and a PTC heating element 109, of the heating apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the power supply 102, the storage 103, the output 104, the sensor 105, the user input 106, the power controller 107, the communication device 108 and the PTC heating element 109 of the heating apparatus 100. The information may be sent and received via a bus or network, or may be directly read or written to/from one or more of the power supply 102, the storage 103, the output 104, the sensor 105, the user input 106, the power controller 107, the communication device 108 and the PTC heating element 109 of the heating apparatus 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the storage 103, the output 104, the sensor 105, the user input 106, the power controller 107, the communication device 108 and the PTC heating element 109, of the heating apparatus 100. The power supply 102 may include one or more from among a battery, an outlet, a capacitor, a solar energy cell, a generator, a wind energy device, an alternator, etc.

The storage 103 is configured for storing information and retrieving information used by the heating apparatus 100. The information may include information on interior cabin temperature or exterior ambient temperature provided by a sensor 105, a thermometer or other suitable temperature sensor. The storage 103 may be controlled by the controller 101 to store and retrieve information received from one or more sensors 105 as well as computer or machine executable instructions to control the PTC heating element 109. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the heating apparatus 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of the activation or deactivation of the PTC heating element 109 or the heating apparatus 100. The output 104 may also display image and information provided by one or more sensors 105. The output 104 may display a graphic illustrating positions of the PTC heating elements 109 and indicating their statuses, e.g., on, off, power setting, etc.

The sensor 105 may include one or more from among a thermometer, a power sensor, and a temperature sensor. The power sensor may be a current sensor, voltage sensor, or other sensor detect the current or other power value of the signal being output to the PTC heating element 109.

The user input 106 is configured to provide information and commands to the heating apparatus 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the heating apparatus 100.

The power controller 107 may include circuitry configured to control or adjust voltage and frequency of a power signal being applied to the PTC heating element. The power controller 10 may include a signal generator such as a pulse generator (e.g., a solid-state pulse generator) and/or an amplifier. In addition, the power controller 107 may include a direct current to direct current convertor and pulse generator such as a solid-state pulse generator. According to one example, the power controller may include transformer configured to convert AC power supplied by the power supply to an AC voltage and frequency to power the PTC heating element 109. According to another example, the power controller may include a direct current (DC) to DC converter configured to convert the power supplied by the power supply to an appropriate voltage and frequency to power the PTC heating element 109.

The communication device 108 may be used by heating apparatus 100 to communicate with several types of external apparatuses according to various communication methods. The communication device 108 may be used to send/receive various information such as information on operation mode of the vehicle and control information for operating the heating apparatus 100 to/from the controller 101.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

The PTC heating element 109 is an electrical device that generates heat when an electrical current is passed through the element. The heating element is self-regulating and self-limiting because the electrical resistance of the element increases as the element's temperature rises. In particular, PTC heating element 109 may be a flexible substrate and with a printed ink or a rubber. The PTC heating element 109 may comprise ceramic, silicon rubber or carbon-based ink applied to a plastic film.

Figure 2A:
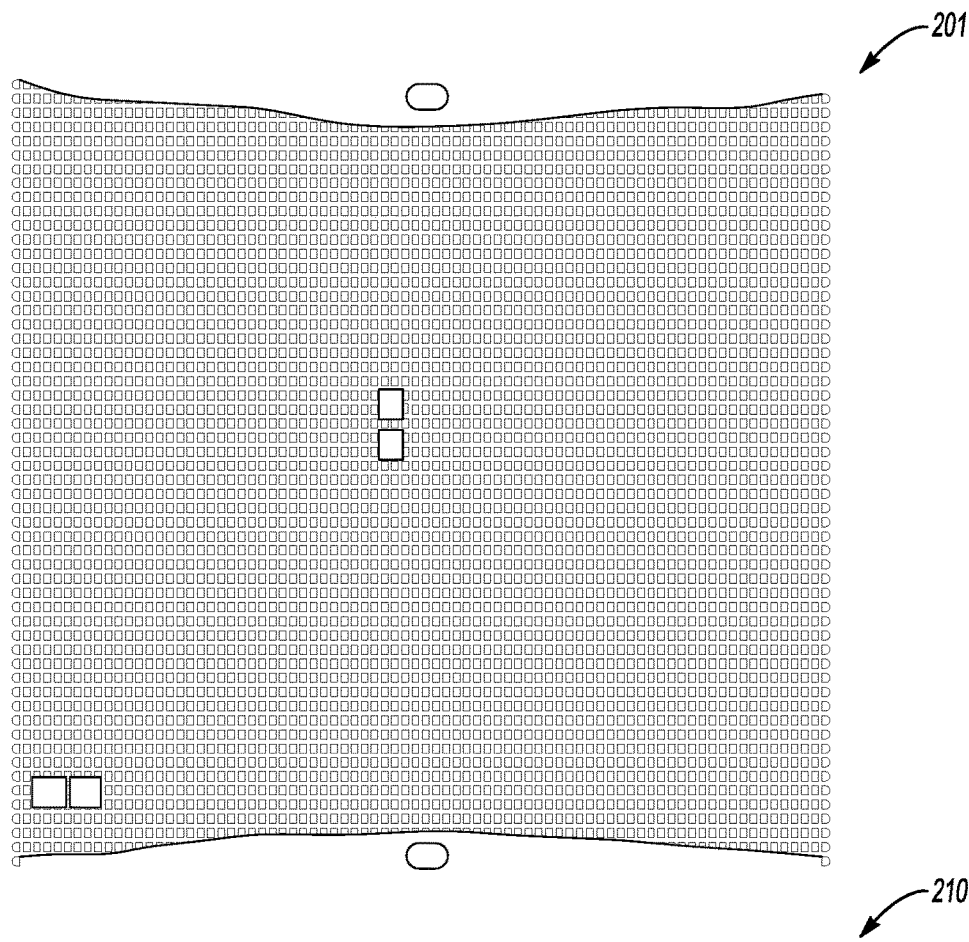
FIGS. 2A and 2B show illustrations of a positive temperature coefficient heating element and a graph illustrating power settings corresponding to cabin air temperature according to aspects of exemplary embodiments.
Figure 2B:
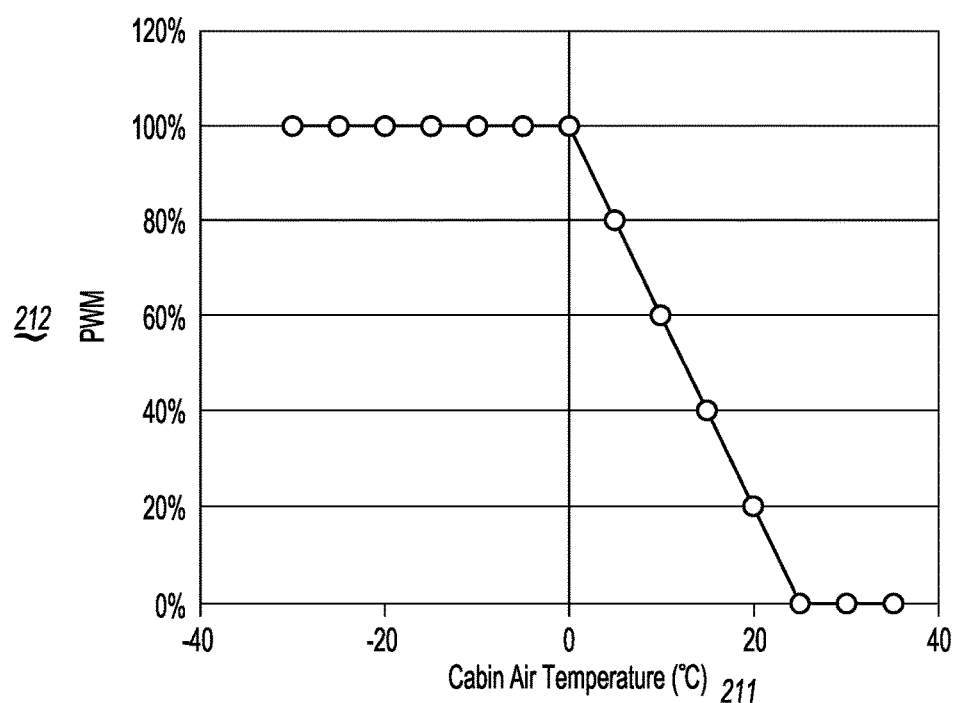

FIGS. 2A and 2B show illustrations of a positive temperature coefficient heating element and a graph illustrating power settings corresponding to cabin air temperature according several aspects of exemplary embodiments.

Referring to FIG. 2A, a flexible PTC heating element 201 is shown. The PTC heating element 201 includes a pattern printed onto a substrate that is connected to two electrodes configured to apply power to the printed ink. The application of power causes the printed ink pattern to radiate heat.

Referring to FIG. 2B, an example graph 210 of showing the power values of a pulse width modified signal applied to the PTC heating elements and the cabin air temperature 211 corresponding to the power values 212. The example illustrated in graph 210 shows that the pulse width modified signal is set to full power when the temperature is less than a first predetermined value and is turned off when the temperature is greater than a second predetermined value. Moreover, the pulse width modified signal linearly varies if the temperature is between the first determined value and second predetermined value. In this example, between 0 and 25 degrees Celsius.

Figure 3A:
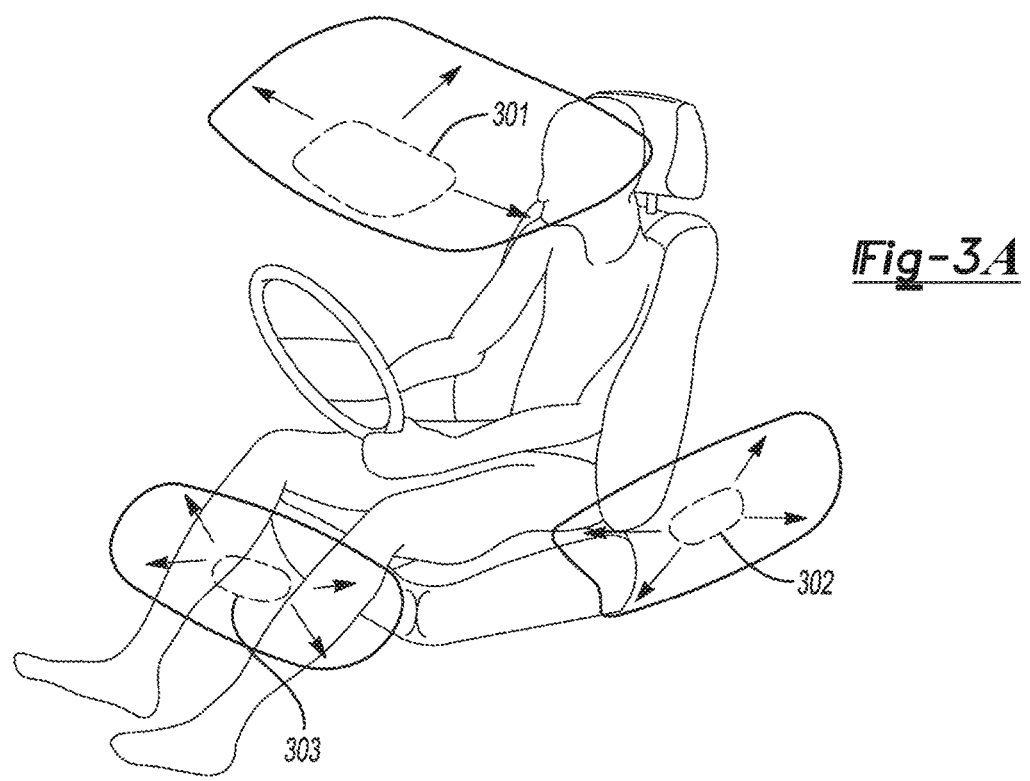
FIGS. 3A and 3B show various integrations of a positive temperature coefficient heating element according to several exemplary embodiments.
Figure 3B:
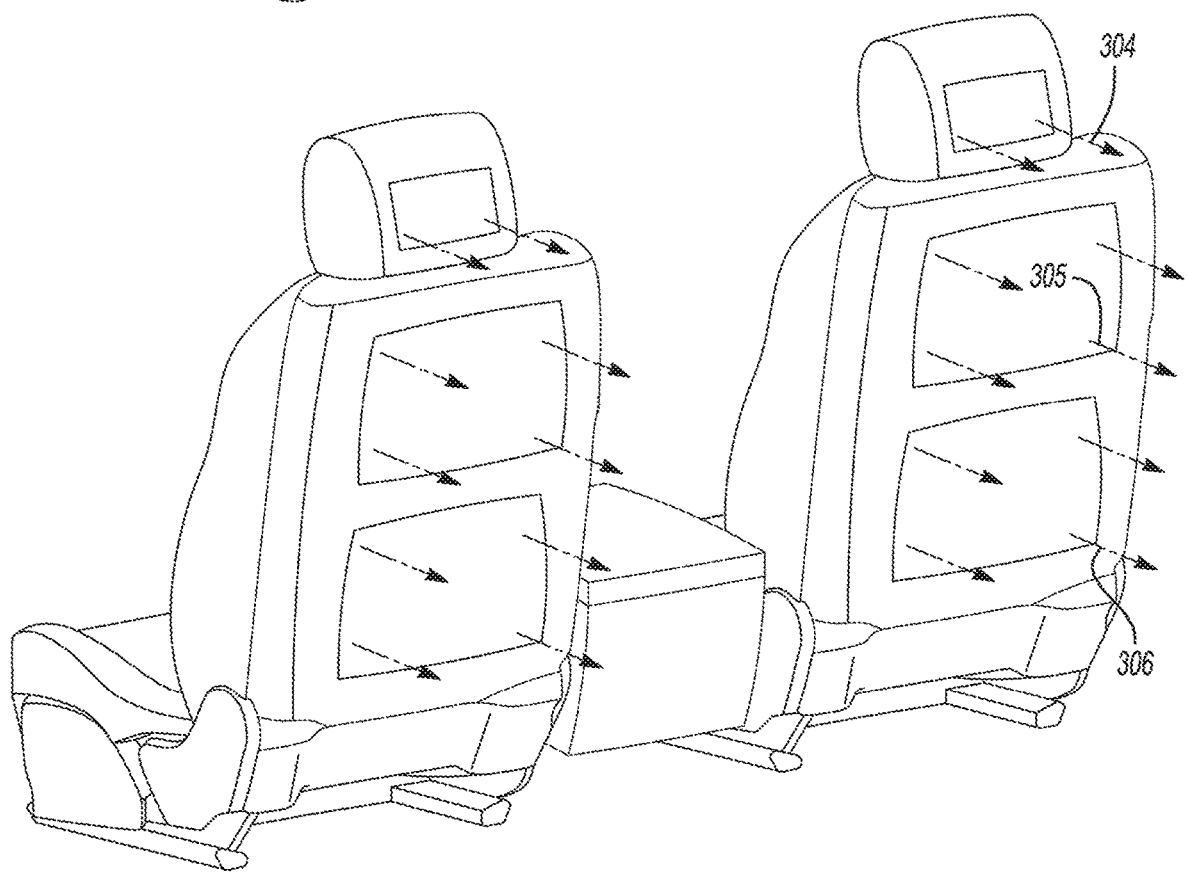

FIGS. 3A and 3B show various integrations of a positive temperature coefficient heating element according to several exemplary embodiments.

Referring to FIG. 3A, PTC heating elements 109 may be integrated into one or more from among a headliner 301, in a door trim 302 and an area under a dashboard 303. Other examples, of PTC heating element 109 integration may include a dashboard, a steering wheel, a center console, etc. In addition, referring to FIG. 3B, PTC heating elements 109 may also be integrated into one or more from among a backside of a headrest 304, an upper backside of a seat 305, and a lower backside of a seat 306.

Figure 4A:
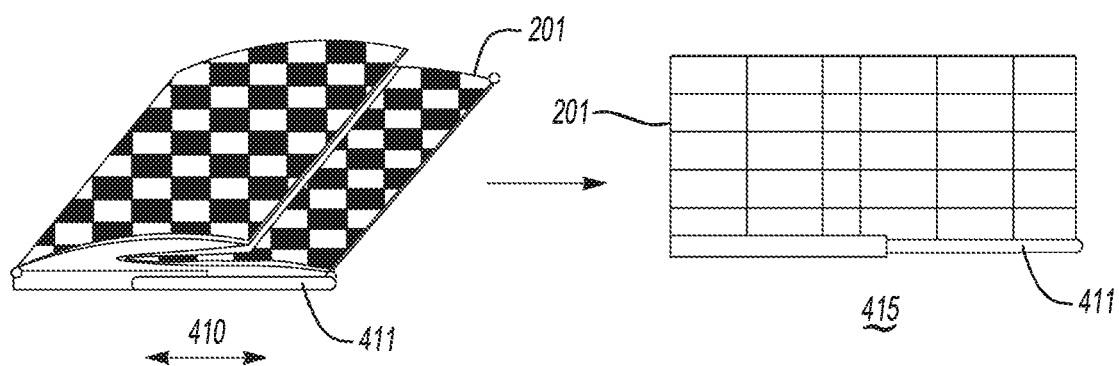
FIGS. 4A-4C show various illustrations of deployable positive temperature coefficient heating elements according to several exemplary embodiments.
Figure 4B:
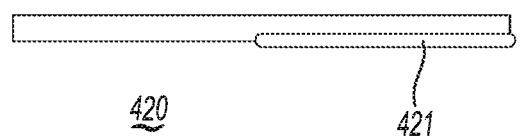
Figure 4C:
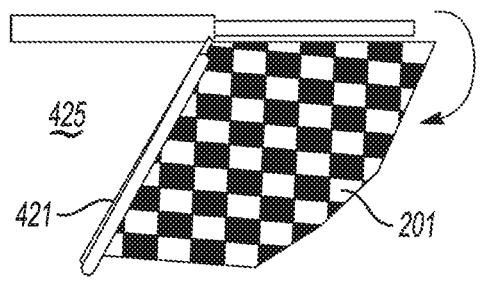
Figure 4C:
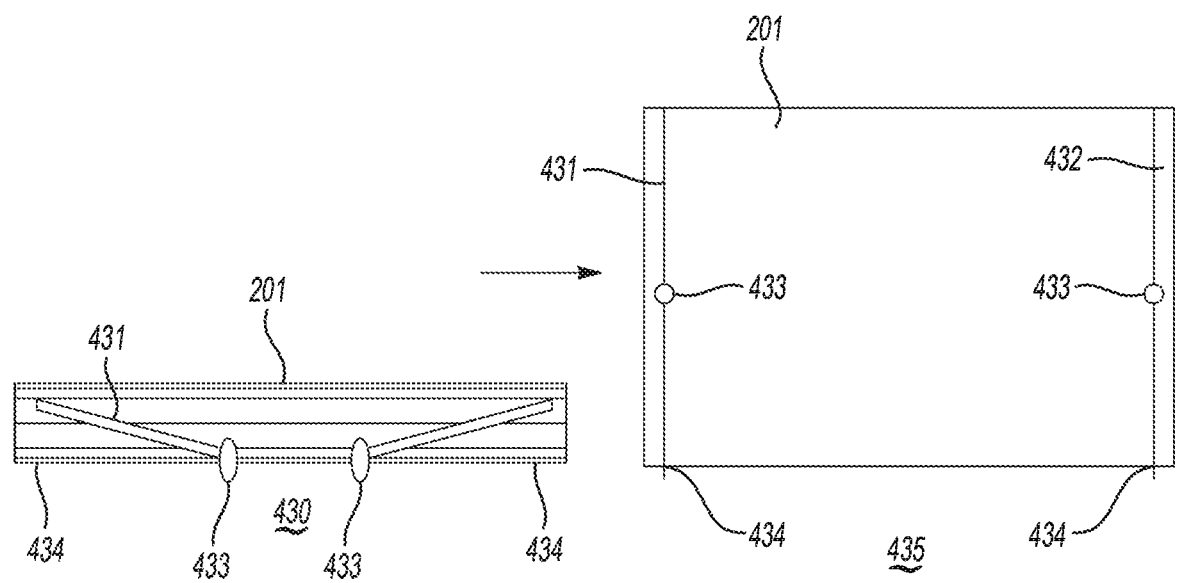

FIGS. 4A-4C show various illustrations of deployable positive temperature coefficient heating elements according to several exemplary embodiments.

Referring to FIG. 4A, the PTC heating element 201 is a bifold PTC heating element 410. The bifold may be a Z-fold. A sliding member 411 is arranged at one or two longitudinal edges of the bifold PTC heating element 410 perpendicular to the fold lines of the bifold PTC heating element 410. The sliding member 411 may slide along a guide so as to deploy the bifold PTC heating element 410 to an expanded state 415 and retract the bifold PTC heating element 410 back to a folded state. The sliding member 411 may be actuated by a motor, an actuator, a shape memory alloy or other electromechanical device, or may be moved manually.

Referring to FIG. 4B, the PTC heating element 201 may be configured as a single fold PTC heating element 420. The single fold may be a half-fold. The single fold PTC heating element 420 may include a rotating member 421 arranged one side of the single fold PTC heating element 420 perpendicular to a fold line of the single fold PTC heating element 420. The rotating member 421 rotates around an axis 422 of the single fold so as to deploy the single fold PTC heating element 420 to an open state 425 and close the PTC heating element to a folded state. The rotating member 421 may be on the side of the single fold PTC heating element 420 that does not radiate heat or at an edge of the single fold PTC heating element 420. The rotating member 421 may be actuated by a motor, an actuator, a shape memory alloy or other electromechanical device, or may be moved manually.

Referring to FIG. 4C, the PTC heating element 201 may be configured as an accordion fold PTC heating element 430 including a plurality of folds. The accordion fold PTC heating element 430 may include two double jointed arms 431 and 432 arranged at opposite edges of the PTC heating element 201 perpendicular to fold lines of the PTC heating element.

The first arm 431 of the double-jointed arms is disposed at one end that is parallel to the plurality of folds. The first arm 431 may include a first joint 434 at a first end of the first arm and a second joint 433 disposed between the first joint and a second end of the first arm. The first joint is configured to rotate a first or lower part of the first arm 431 in a counter-clockwise direction and the second joint 433 is configured to rotate a second or upper part of the first arm 431 in a clockwise direction to expand the PTC heating element to a deployed state 435 and the first joint 434 is configured to rotate in a clockwise direction and the second joint 433 is configured to rotate in a counter-clockwise direction to retract the PTC heating element to a folded state. The first arm 431 may be actuated by a motor, an actuator, a shape memory alloy or other electromechanical device, or may be moved manually.

The second arm 432 of the double-jointed arms is disposed at the one end that is parallel to the plurality of folds on a side opposite to the first arm. The second arm 432 may include a first joint 434 at a first end of the second arm and a second joint 433 disposed between the first joint and a second end of the second arm 432. The first joint 434 of the second arm 432 may be configured to rotate in a clockwise direction and the second joint 433 of the second arm 432 may be configured to rotate in a counter-clockwise direction to expand the PTC heating element to the deployed state 435 and the first joint 434 of the second arm 432 may be configured to rotate in a counter-clockwise direction and the second joint 433 of the second arm 432 may be configured to rotate in a clockwise direction to retract the PTC heating element to the folded state. The second arm 432 may be actuated by a motor, an actuator, a shape memory alloy or other electromechanical device, or may be moved manually.

FIGS. 5A-5C show additional illustrations of deployable positive temperature coefficient heating elements according to several exemplary embodiments.

Referring to FIG. 5A, in one example, the PTC heating element may include a plurality of sections 501-506. The plurality of sections 501-506 may be stacked on top of each other in a retracted state 510. The plurality of sections 501-506 may be configured to rotate around an axis or rod 512 to so as to move from stacked positions 511 in the retracted state 510 to adjacent positions in the deployed state 515. The rod 512 may be actuated by a motor, an actuator, a shape memory alloy or other electromechanical device, or may be moved manually.

In another example in FIG. 5B, the PTC heating element may include a cylindrical structure 532. The cylindrical structure 532 may include a plurality of fold lines 521 running around a circumferential axis such that the cylindrical structure expands 530 and retracts 520 along a longitudinal axis of the cylindrical structure 532. Alternatively, as shown in FIG. 5C, the cylindrical structure 532 may expand and retract along an arc as shown in illustration 531. The cylindrical structure 532 of element may be expanded or contracted by a motor, an actuator, a shape memory alloy or other electromechanical device, or may be moved manually.

In yet another example shown in FIG. 5D, a box 543 of supplies, food or medical supplies requiring a controlled temperature environment may be placed in a container or space 540. The container or space may be integrated into a vehicle. One or more of the inner walls (e.g., upper, lower, left, right) of the container 540 may be lined with the PTC heating element 542.

Figure 6A:
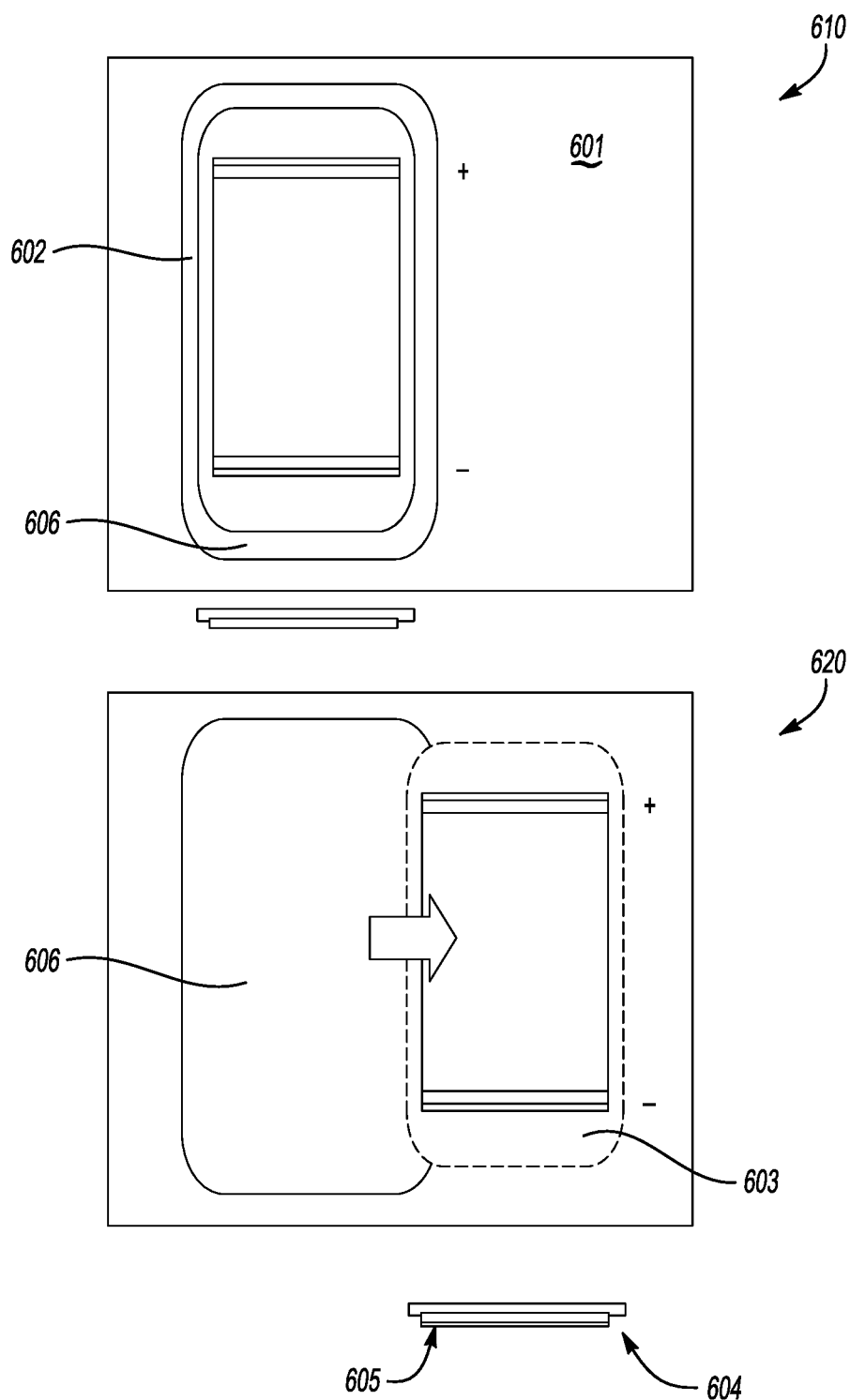
FIGS. 6A-6C show illustrations positive temperature coefficient heating elements integrated in a shade according to exemplary embodiments.
Figure 6B:
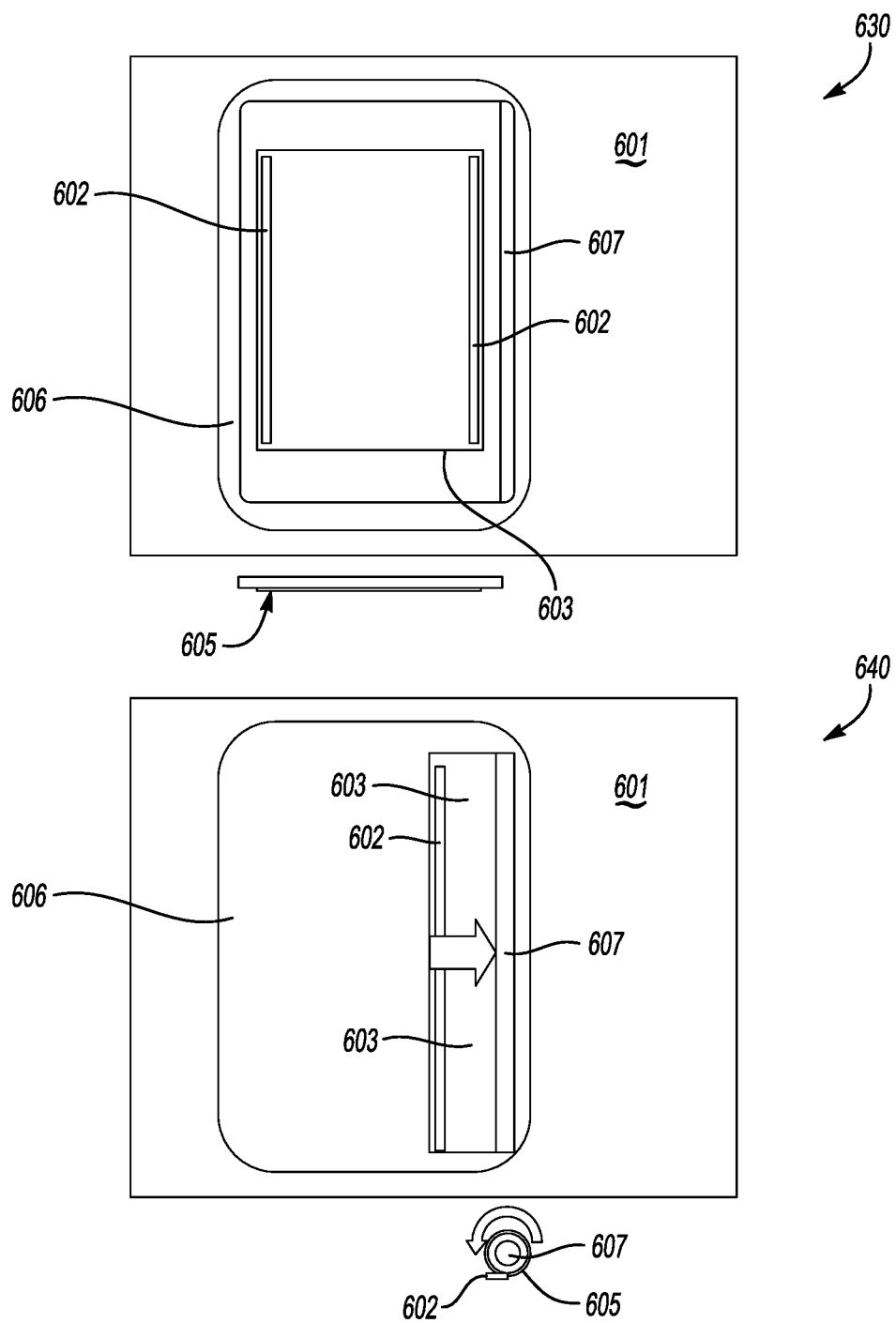
Figure 6C:
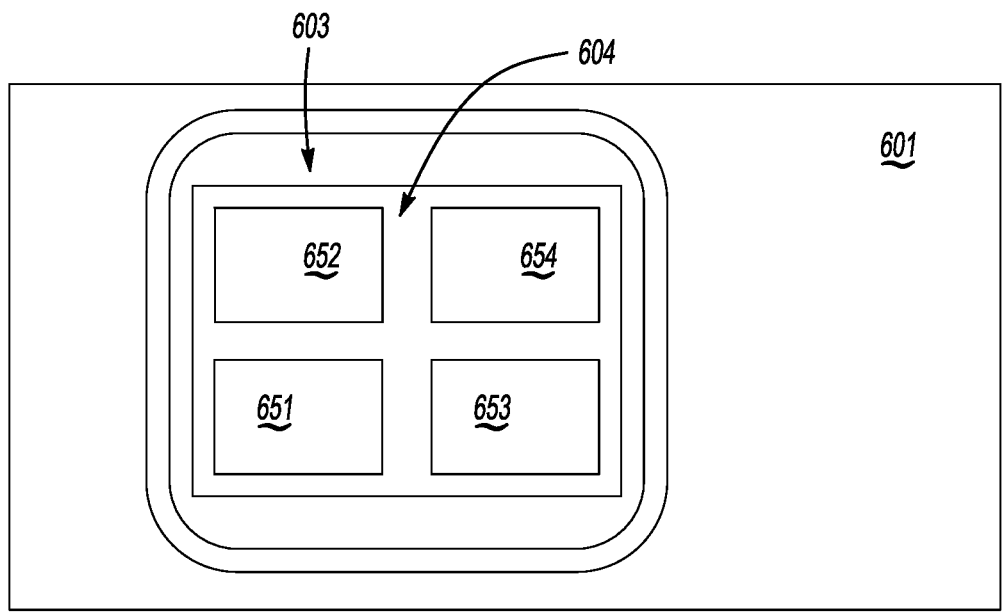

FIGS. 6A-6C show illustrations positive temperature coefficient heating elements integrated in a shade according to several aspects of an exemplary embodiment.

Referring to FIG. 6A, a sliding shade 606 is shown. The sliding shade 606 may cover a moonroof, sunroof or another window of a vehicle. In the example, shown in FIG. 6A, the sliding shade 606 slides across a roof 601 of a vehicle. The sliding shade 606 may include busbars 602 and an insulation layer 604 interposed between an interior facing part 603 of the sliding shade 606 and a PTC heating element 605. The PTC heating element 605 may be disposed on the insulation layer 604. The sliding shade 606 may transition from a closed position 610 to an open position 620 by sliding or rolling along guides, rails or other mechanism. The sliding shade 606 may be actuated by a motor, an actuator, a shape memory alloy or other electromechanical device, or may be moved manually.

Referring to FIG. 6B, a rolling shade 606 is shown. The rolling shade 606 may cover a moonroof, sunroof or another window of a vehicle. The rolling shade 606 may include busbars 602 and an insulation layer interposed between an interior facing part 603 of the rolling shade 606 and the PTC heating element 605. The PTC heating element 605 may be disposed in between the busbars 602. The insulation layer is optional and, according to an example, the insulation layer may be omitted. The rolling shade 606 may transition from a closed position 630 to an open position 640 by being rolled onto rolling rod 607. The rod 607 may be actuated by a motor, an actuator, a shape memory alloy or other electromechanical device, or may be moved manually.

Referring to FIG. 6C, a zoned PTC heating system 650 is shown. a shade 603 including a plurality of the PTC heating element (651-654) is shown. An insulation layer 604 interposed between an interior facing part of the sliding shade and the plurality of the PTC heating element (651-654) is shown. The plurality of the PTC heating element (651-654) are disposed on the insulation layer 604. The shade may be sunroof, moonroof or panoramic sunroof disposed in a vehicle roof 601.

A first PTC heating element 651 of the plurality of the PTC heating element (651-654) is disposed on a section of the shade above a front left seat and a second PTC heating element 652 of the plurality of the PTC heating element (651-654) is disposed on a section of the shade above a front right seat. Moreover, a third PTC heating element 653 of the plurality of the PTC heating element (651-654) is disposed on a section of the shade above a rear left seat and a fourth PTC heating element 654 of the plurality of the PTC heating element (651-654) is disposed on a section of the shade above a rear right seat.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A heating apparatus comprising:
   a rolling shade comprising busbars, wherein the rolling shade comprises a sunroof shade integrated in a vehicle roof;
   a positive temperature coefficient (PTC) heating element; and
   an insulation layer interposed between an interior facing part of the rolling shade and the PTC heating element;
   wherein the PTC heating element is disposed in between the busbars and on the insulation layer; and
   a power controller configured to generate and apply a pulse width modified signal to the PTC heating element;
   wherein the power controller is configured to vary a current of the pulse width modified signal linearly with respect to a temperature of a space being heated by the PTC heating element.

2. The heating apparatus of claim 1, wherein the positive temperature coefficient (PTC) heating element is integrated into one or more from among a backside of a headrest, an upper backside of a seat, a lower backside of a seat, an area under a dashboard, a roof, a visor, and a door.

3. The heating apparatus of claim 1, wherein the PTC heating element is a single fold PTC heating element, the apparatus further comprising a rotating member arranged on one side of the single fold PTC heating element perpendicular to a fold line of the single fold PTC heating element,
   wherein the rotating member rotates around an axis of the single fold so as to deploy the PTC heating element to an open state and close the PTC heating element to a folded state.

4. The heating apparatus of claim 1, wherein the PTC heating element is a bifold PTC heating element, the apparatus further comprising a sliding member arranged at an edge of the bifold PTC heating element perpendicular to a fold line of the bifold PTC heating element,
   wherein the sliding member slides along a guide so as to deploy the PTC heating element to an expanded state and retract the bifold PTC heating element to a folded state.

5. The heating apparatus of claim 1, wherein the PTC heating element comprises a plurality of folds, the apparatus further comprising two double jointed arms arranged at opposite edges of the PTC heating element perpendicular to fold lines of the PTC heating element,
   wherein the first arm of the double jointed arms is disposed at one end parallel to the plurality of folds, the first arm comprising a first joint at a first end of the first arm and a second joint disposed between the first joint and a second end of the first arm, wherein the first joint is configured to rotate in a counter-clockwise direction and the second joint is configured to rotate in a clockwise direction to expand the PTC heating element to a deployed state and the first joint is configured to rotate in a clockwise direction and the second joint is configured to rotate in a counter-clockwise direction to retract the PTC heating element to a folded state, and
   wherein the second arm of the double jointed arms is disposed at the one end parallel to the plurality of folds on a side opposite to the first arm, the second arm comprising a third joint at a first end of the second arm and a fourth joint disposed between the third joint and a second end of the second arm, wherein the third joint is configured to rotate in a clockwise direction and the fourth joint is configured to rotate in a counter-clockwise direction to expand the PTC heating element to the deployed state and the third joint is configured to rotate in a counter-clockwise direction and the fourth joint is configured to rotate in a clockwise direction to retract the PTC heating element to the folded state.

6. The heating apparatus of claim 1, wherein the positive temperature coefficient (PTC) heating element comprises a cylindrical structure comprising a plurality of fold lines running around a circumferential axis such that the cylindrical structure expands and retracts along a longitudinal axis of the cylindrical structure.

7. The heating apparatus of claim 1, wherein the PTC heating element comprises a plurality of sections, and
wherein the plurality of sections are stacked on top of each other in a retracted state, configured to rotate around an axis to so as to move from stacked positions in the retracted state to adjacent positions in the deployed state.

8. The heating apparatus of claim 1, further comprising:
a shade comprising a plurality of the PTC heating elements;
an insulation layer interposed between an interior facing part of the shade and the plurality of the PTC heating elements,
wherein the plurality of the PTC heating elements are disposed on the insulation layer, and
wherein a first PTC heating element of the plurality of the PTC heating elements is disposed on a section of the shade above a front left seat and a second PTC heating element of the plurality of the PTC heating elements is disposed on a section of the shade above a front right seat.

9. The heating apparatus of claim 8, wherein a third PTC heating element of the plurality of the PTC heating elements is disposed on a section of the shade above a rear left seat and a fourth PTC heating element of the plurality of the PTC heating element is disposed on a section of the shade above a rear right seat.

10. The heating apparatus of claim 1, wherein the busbars are arranged parallel to a rod of the rolling shade.

11. The heating apparatus of claim 1, wherein the power controller is configured to set the current of the pulse width modified signal to 100% if the temperature of the space being heated is less than a first predetermined value and set the current of the pulse width modified signal to 0% if the temperature of the space being heated is greater than a second predetermined value, the second predetermined value being greater than the first predetermined value.

12. The heating apparatus of claim 11, wherein the power controller is configured to vary the current of the pulse width modified signal linearly if the temperature of a space being heated is between the first determined value and second predetermined value.

13. The heating apparatus of claim 1, wherein the PTC heating element comprises a flexible printed circuit.

14. The heating apparatus of claim 1, wherein the PTC heating element comprises one or more from among ceramic, silicon rubber, and carbon.

15. The heating apparatus of claim 1, wherein the space being heated by the PTC heating element comprises a vehicle interior.

16. The heating apparatus of claim 15, wherein the temperature comprises the temperature of the vehicle interior.

* * * * *